US005594738A

United States Patent [19]
Crisler et al.

[11] Patent Number: 5,594,738
[45] Date of Patent: Jan. 14, 1997

[54] TIME SLOT ALLOCATION METHOD

[75] Inventors: Kenneth J. Crisler, Lake Zurich; Michael L. Needham, Palatine, both of Ill.

[73] Assignee: Motorola, Inc., Schaumburg, Ill.

[21] Appl. No.: 494,618

[22] Filed: Jun. 23, 1995

Related U.S. Application Data

[63] Continuation-in-part of Ser. No. 137,541, Oct. 18, 1993, Pat. No. 5,515,379.

[51] Int. Cl.$^6$ .................................................. H04J 3/16
[52] U.S. Cl. ................................................ 370/347
[58] Field of Search ............................... 370/24, 29, 30, 370/85.6, 85.7, 94.1, 94.2, 94.3, 95.1, 95.2, 95.3, 110.1; 455/53.1, 54.1, 54.2; 395/856, 858, 859, 865; 340/825.5, 825.51, 825.52, 825.54

[56] References Cited

U.S. PATENT DOCUMENTS

| | | | |
|---|---|---|---|
| 4,319,353 | 3/1982 | Alvarez, III et al. | 370/104 |
| 4,612,637 | 9/1986 | David et al. | 370/95.3 |
| 4,736,371 | 4/1988 | Tejima et al. | 370/95 |
| 5,166,929 | 11/1992 | Lo | 370/85.3 |
| 5,197,125 | 3/1993 | Engel et al. | 395/200 |
| 5,239,545 | 8/1993 | Buchholz | 370/95.3 |
| 5,299,198 | 3/1994 | Kay et al. | 370/95.3 |
| 5,299,199 | 3/1994 | Wilson et al. | 370/95.3 |
| 5,303,234 | 4/1994 | Kou | 370/85.2 |
| 5,420,864 | 5/1995 | Dahlin et al. | 370/95.3 |

OTHER PUBLICATIONS

Wong, W. C. and Goodman, D. J., "A Packet Reservation Multiple Access Protocol For Integrated Speech And Data Transmission", IEEE Proceedings-1, vol. 139, No. 6, Dec. 1992, pp. 607–612.

*Primary Examiner*—Hassan Kizou
*Attorney, Agent, or Firm*—Daniel C. Crilly

[57] ABSTRACT

Uplink time slots (108) may be allocated within a communication system (100) when a communication unit (102) transmits a first packet (501) to a time slot allocator (101). Upon receiving the first packet (501), the time slot allocator (101) determines whether the first packet (501) contains a request for allocation of N uplink time slots. When the first packet (501) contains the request for allocation of N uplink time slots, the time slot allocator (101) allocates the N uplink time slots to the communication unit (102) when the N uplink time slots are available, wherein the N uplink time slots are allocated contiguous in time. The time slot allocator (101) then transmits an allocation indication to the communication unit in each of N downlink time slots (110) corresponding to the N allocated uplink time slots (108) to inform the communication unit (102) of the allocation.

13 Claims, 4 Drawing Sheets

-PRIOR ART-

TIME SLOT ALLOCATION METHOD

CROSS-REFERENCE TO RELATED APPLICATION

This application is a continuation-in-part of application Ser. No. 08/137,541, entitled "A Time Slot Allocation Method", filed Oct. 18, 1993, now U.S. Pat. No. 5,515,379, and assigned to the assignee of the instant application.

FIELD OF THE INVENTION

The present invention relates generally to radio communication systems and, in particular, to a method for allocating time slots in a time division multiple access communication system.

BACKGROUND OF THE INVENTION

Radio communication systems are known to include a plurality of communication units that transceive information over communication resources via a plurality of base stations, or repeaters. Generally, radio communication systems also include a central controller, or communication resource allocator, that allocates the communication resources to the communication units. The communication units may be mobile radios, portable radios, or radiotelephones; whereas, the communication resources may be frequency carriers, pairs of frequency carriers, time slots, pairs of time slots, or combinations of time slots and frequency carriers, depending on the multiplexing scheme incorporated in the communication system. In a time division multiple access (TDMA) communication system, the communication resources comprise time slots or time slot pairs. When the communication resources comprise time slot pairs, each time slot pair includes an uplink (communication unit to base station) time slot and a downlink (base station to communication unit) time slot.

Utilization of time slots by communication units in a TDMA communication system is commonly accomplished using two known protocols, those being: slotted ALOHA and reservation ALOHA. With a slotted ALOHA protocol, each transmitting communication unit attempts to send its information in a randomly chosen uplink time slot to a base station, or repeater. When the selected uplink time slot is unoccupied, a communication unit's information is sent to the base station. However, when the random uplink time slot is currently occupied, a "collision" of information occurs and the transmitted information does not reach the base station. Accordingly, the information must be re-transmitted if the base station is to receive the information.

Due to the randomness of the slotted ALOHA protocol, slotted ALOHA is a very inefficient method for transmitting data packets. For single data packets (i.e., packets resident in one uplink time slot), the theoretical maximum throughput efficiency using slotted ALOHA is approximately thirty-seven percent. Thus, approximately one in every three transmission attempts is successful during maximum channel loading. The other sixty-three percent of the transmissions require re-transmission attempts. For data messages requiring multiple data packets (i.e., messages resident in multiple uplink time slots), each individual packet in the data message is transmitted using the slotted ALOHA protocol. Since each packet is subject to a possible "collision", throughput efficiency for large data messages is significantly worse than for a single packet transmission.

In contrast to slotted ALOHA, reservation ALOHA provides a more efficient procedure for transmitting long data messages by allocating uplink time slots to communication units on an exclusive use basis. In reservation ALOHA, the multitude of uplink time slots are divided into a plurality of uplink time frames. Thus, each uplink time frame includes a predetermined number of uplink time slots (e.g., five time slots per time frame). A communication unit transmits a small data packet to the communication resource allocator (also called a time slot allocator) in one uplink time slot of a particular uplink time frame via the slotted ALOHA protocol. The small data packet includes a request for the number of uplink time slots required to transmit the long data message. Upon receipt of the request packet, the time slot allocator allocates the requested number of uplink time slots by reserving one time slot in each succeeding uplink time frame to the requesting communication unit. Thus, the communication unit's transmission requires a substantially identical number of time frames as time slots to complete the transmission of the long data message. For example, when a communication unit requests four uplink time slots via the request packet, the time slot allocator allocates one time slot in each of the next four consecutive uplink time frames.

Although reservation ALOHA provides improved throughput efficiency for transmitting long data messages by employing time slot reservation, it inherently introduces lengthy transmission time delays due to its time slot allocation procedure. As described above, a multiple slot data message requires multiple uplink frame times to be transmitted. Thus, the time required to complete transmission of the multiple slot message is equivalent to the number of uplink time frames necessary to transmit the message one slot per frame. Depending on data message length and time frame period, this delay may be excessive. For example, with a time frame period of seventy-five milliseconds (fifteen milliseconds per time slot) and a data message length of four time slots, a transmission time of three hundred milliseconds is required.

Therefore, a need exists for a time slot allocation method that substantially reduces the transmission time delay associated with prior art allocation procedures and improves the transmission channel throughput efficiency.

DESCRIPTION OF A PREFERRED EMBODIMENT

Generally, the present invention provides a method for allocating a plurality of uplink time slots to one or more communication units in a communication system. This is accomplished when a communication unit transmits a first packet to a time slot allocator in an available uplink time slot. The first packet may include a request for allocation of N uplink time slots or a request to transmit multiple packets. Upon receiving the first packet, the time slot allocator determines the type of request. When the request is for N uplink time slots, the time slot allocator allocates the N uplink time slots substantially contiguous in time to the communication unit when the N uplink time slots are available. The time slot allocator then transmits an allocation indication to the communication unit in each of N downlink time slots that correspond to the N allocated uplink time slots to confirm the allocation of each of the N allocated uplink time slots. When the request is for multiple packets, the time slot allocator allocates uplink time slots substantially contiguous in time to the communication unit until the multiple packets have been transmitted. The time slot allocator transmits of an allocation indication in the downlink time slots corresponding to the allocated uplink time slots to confirm the allocation of each allocated uplink time slot to be used to transmit the multiple packets. By allocating time slots in this manner, a more efficient utilization of communication channel bandwidth is attained over a wide range of channel loading conditions in comparison to prior art methodologies.

Figure 1:
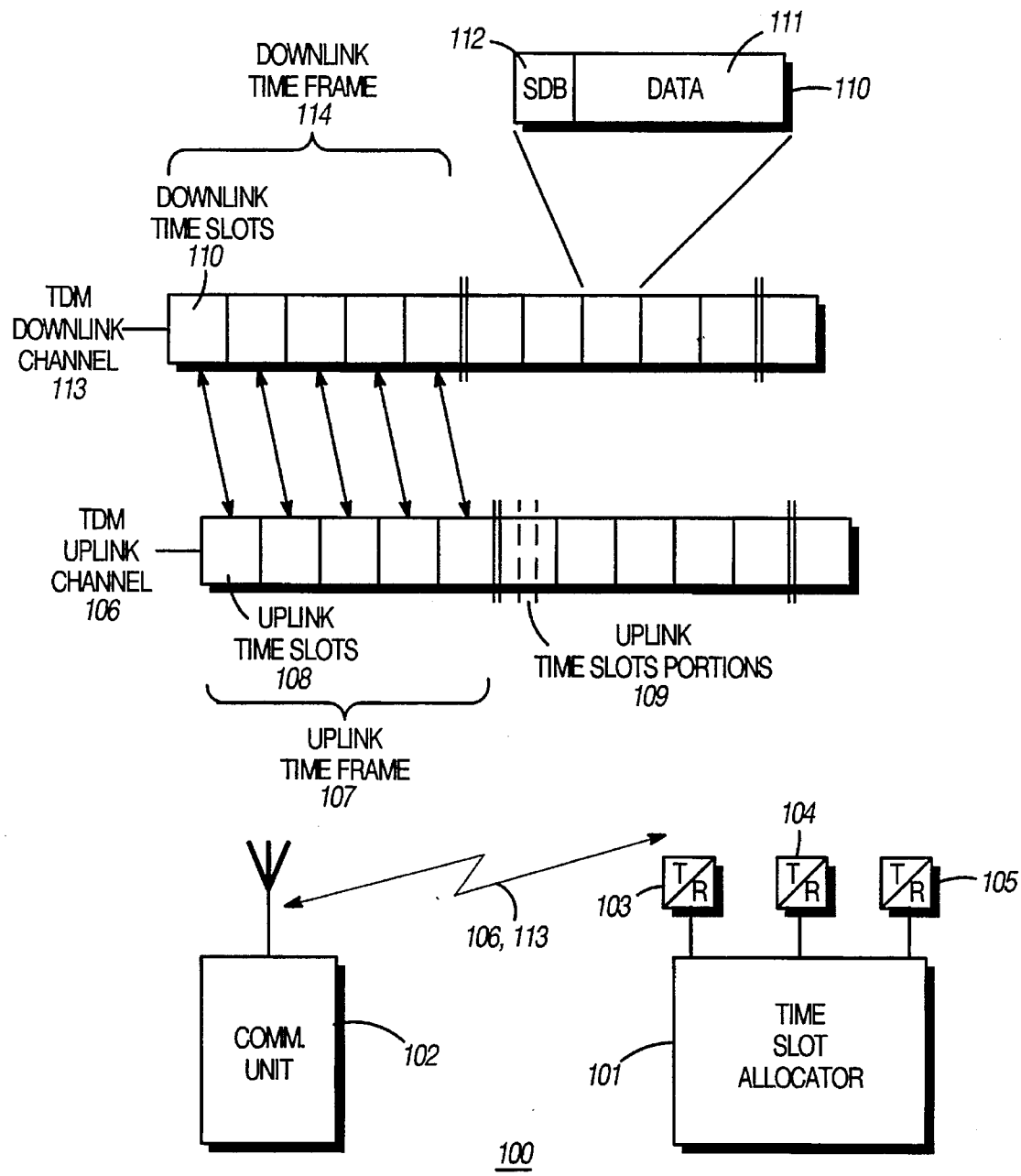
FIG. 1 illustrates a time division multiple access communication system in accordance with the present invention.

The present invention can be more fully described with reference to FIGS. 1–5. FIG. 1 illustrates a time division multiple access (TDMA) communication system 100 that includes a time slot allocator 101, a plurality of communication units (one communication unit 102 shown), and a plurality of base stations, or repeaters 103–105 (three shown). The communication unit 102, which may be a mobile radio, portable radio, or radiotelephone, transmits information to the base stations 103–105 via an uplink time division multiplex (TDM) channel 106 and receives information from the base stations 103–105 via a downlink TDM channel 113. The uplink TDM channel 106 preferably comprises equal-length uplink time slots 108 and uplink time slot portions 109 that are typically grouped into uplink time frames 107. Each uplink time frame 107 includes a predetermined number of uplink time slots 108. The downlink TDM channel 113 preferably comprises equal-length downlink time slots 110 that are typically grouped into downlink time flames 114. The uplink channel 106 and the downlink channel 113 are preferably arranged such that a one-to-one correspondence exists between the uplink time slots 108 and the downlink time slots 110. That is, each uplink time slot 108 has an associated downlink time slot 110 (as denoted by the arrows between the uplink TDM channel 106 and the downlink TDM channel 113 in FIG. 1). It should be noted that although only a single pair of communication channels 106, 113 are shown in FIG. 1, a unique pair of channels 106, 113 is preferably provided for each of the base stations 103–105.

As shown, each of the downlink time slots 110 preferably comprises a slot descriptor block (SDB) 112 and a data field 111. The data field 111 is used to transmit information data packets to the communication unit 102. The slot descriptor block 112 contains status information related to the downlink time slot 110 and its associated uplink time slot 108. In a preferred embodiment, the uplink and downlink channel arrangement is such that the uplink time slots 108 are slightly delayed in time with respect to their corresponding downlink time slots 110. This delay affords each communication unit (e.g., 102) sufficient time to receive the slot descriptor block 112 and determine the status of the uplink time slot 108 prior to the start of the uplink time slot 108.

The time slot allocator 101 preferably comprises a central controller or digital logic circuitry contained within the base stations 103–105. The time slot allocator 101 allocates the uplink time slots 108 to the communication unit 102 when the communication unit 102 requests to communicate.

Operation of the TDMA communication system 100 generally occurs in the following manner. When a communication unit 102 desires to transmit a data message, the communication unit 102 examines the status information contained in the slot descriptor block 112 of each downlink time slot 110 to determine if an uplink time slot 108 is available. An available uplink time slot 108 is an uplink time slot 108 that has not been allocated by the time slot allocator 101 to another communication unit or is not otherwise in use for other communication services. In a preferred embodiment, an available uplink time slot 108 is divided into uplink time slot portions 109. Thus, an available uplink time slot portion 109 is a portion of a currently unallocated uplink time slot. The availability of an uplink time slot 108 or uplink time slot portion 109 is indicated by the status information contained in the slot descriptor block 112 of an associated downlink time slot 110.

When an available uplink time slot 108, or an available uplink time slot portion 109, is found, the communication unit 102 utilizes the time slot 108 or time slot portion 109 to transmit a first packet to the time slot allocator 101. Typically, the first packet either contains a time slot allocation request or data. When the first packet comprises a time slot allocation request, the first packet identifies the number of uplink time slots necessary to completely transmit the communication unit's data message.

Regardless of the first packet's content, the first packet is received by the time slot allocator 101 via one of the base stations 103–105. When the first packet contains a time slot allocation request, the time slot allocator 101 allocates the desired number of uplink time slots 108 to the communication unit 102 when they are available. However, when the desired number of uplink time slots are unavailable due to previous time slot allocations, the time slot allocator 101 queues the time slot allocation request until the requested number of uplink time slots become available. When the first packet contains a data message, the time slot allocator 101 processes the first packet according to a predetermined processing procedure, such as extracting and decoding the data contained in the first packet.

When the time slot allocator 101 allocates the requested number of uplink time slots 108 to the communication unit 102, the time slot allocator 101 transmits an allocation indication to the communication unit 102 in the slot descriptor block 112 of each downlink time slot 110 associated with the allocated uplink time slots 108. Each allocation indication preferably provides the status of a corresponding uplink time slot 108 (i.e., available or not available), an identification of the particular communication unit 102 to which the associated uplink time slot 108 is allocated (when the uplink time slot is unavailable), and an indication of the remaining length of the allocation. In a preferred embodiment, the remaining length of the allocation is indicated via a slot counter, wherein the value of the slot counter is decreased by one for each consecutive allocated time slot. For example, in the slot descriptor block 112 of a first downlink time slot 110 containing an allocation indication, the value of the slot counter is equal to the requested number of uplink time slots 108. In the slot descriptor block 112 of a second downlink time slot 110, the value of the slot counter is equal to one less than the requested number of uplink time slots 108, and so on for the remainder of the allocation.

Upon allocation of the uplink time slots 108 and reception of an allocation indication in a first downlink time slot 110, the communication unit 102 begins transmitting its data message. During transmission of the data message, the communication unit may continue to monitor the slot descriptor block 112 of each downlink time slot 110 to determine whether the communication unit 102 has been allocated the associated uplink time slot 108.

Figure 2:
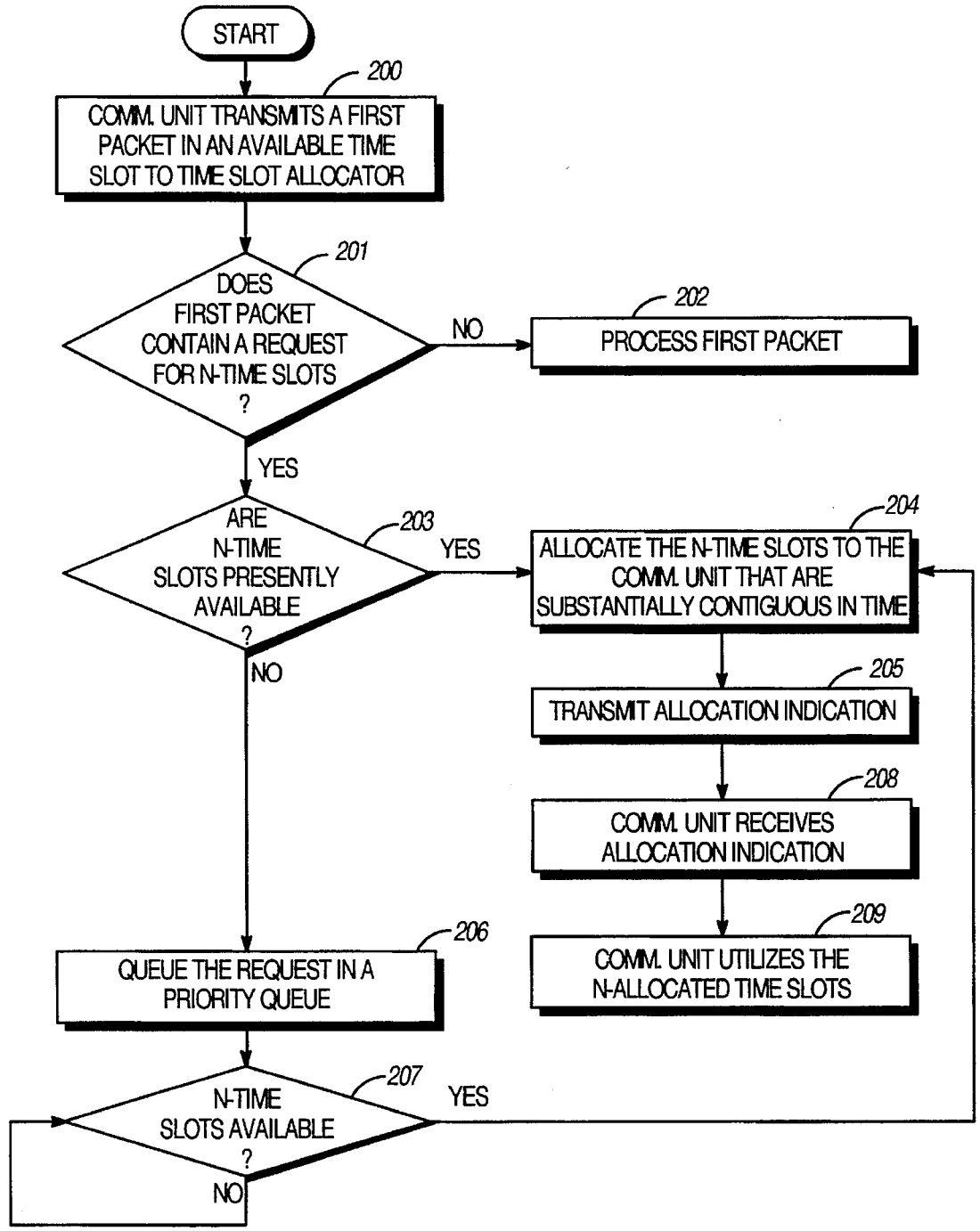
FIG. 2 illustrates a logic flow diagram of steps executed by a time slot allocator and a communication unit in accordance with the present invention.

FIG. 2 illustrates a logic flow diagram of steps executed to implement the present invention. Entering the flow diagram at the START block, logic flow begins when a communication unit transmits (200) a first packet in an available uplink time slot to the time slot allocator. As briefly mentioned above, the first packet may contain a single data packet or a request for allocation of N uplink time slots. When only a small quantity of data needs to be transmitted (i.e., an amount of data which fits entirely in the first uplink time slot), the first packet contains a single data packet. The single data packet generally includes data and other necessary information, such as addressing or error coding, which is required for correct reception and processing of the data. When a large amount of data needs to be sent (i.e., an amount of data which cannot entirely fit in the first uplink time slot), the first packet contains a request for allocation of N uplink time slots. For this case, the first packet includes the number of uplink time slots (N) required to transmit the entire quantity of data and an identification code of the requesting communication unit. Since this type of time slot allocation request occupies a small amount of informational bandwidth, or time, the first packet may be transmitted in a portion of an uplink time slot. Thus, by dividing each available uplink time slot into equal size portions, multiple communication units may transmit time slot allocation requests in a given available uplink time slot.

Various known multiple access methods may be used for determining which communication unit may utilize an available uplink time slot, or time slot portion, for transmission of the first packet. Some examples of these access methods include the slotted-ALOHA protocol, carrier sense multiple access (CSMA), and polling. Thus, no further discussion will be presented except to facilitate an understanding of the present invention.

Upon receiving the first packet, the time slot allocator determines (201) whether the first packet contains a request for N uplink time slots. When the first packet does not contain the request for N uplink time slots, the time slot allocator processes (202) the first packet based on a predetermined processing procedure. In this case, as detailed above, the first packet contains a single data packet. Therefore, the time slot allocator utilizes a predetermined processing procedure, such as extracting and decoding the data contained in the first packet, to process the received first packet. In addition, depending on the content of the extracted and decoded data, the time slot allocator may further process the data by relaying the data to another location.

When the first packet contains the request for N uplink time slots, the time slot allocator determines (203) whether the N uplink time slots are presently available. When the N uplink time slots are presently available, the time slot allocator allocates (204) the N uplink time slots to the communication unit such that the N uplink time slots are substantially contiguous in time. Thus, the N uplink time slots are allocated substantially adjacent to each other in a serial manner without any intervening uplink time slots between them, except those uplink time slots which are not available for data transmission. Uplink time slots may be unavailable for data transmission because they are allocated to other services, such as system control activities. The contiguous allocation of the N uplink time slots extends for the length of the data message. Therefore, depending on the number of uplink time slots requested, the N allocated uplink time slots may occupy two or more consecutive time frames on the uplink TDM channel.

Upon allocation of the N uplink time slots, the time slot allocator transmits (205) an allocation indication in each of N downlink time slots corresponding to the N allocated uplink time slots. Each allocation indication includes the number of allocated uplink time slots and a communication unit identification code that enables the requesting communication unit to verify that particular uplink time slots have been allocated to the communication unit. The communication unit then receives (208) the allocation indication (e.g., in a first downlink time slot) and determines whether the time slot allocator has allocated the N requested uplink time slots.

Upon receiving an allocation indication that indicates allocation of the N requested time slots, the communication unit begins utilizing (209) the N allocated uplink time slots for transmitting a data message. In a preferred embodiment, the communication unit needs only to receive one allocation indication to utilize the N allocated time slots because the allocation indication contains the number of allocated time slots and the communication unit knows, a priori, that time slot allocation for data messages is on a substantially contiguous basis. However, in an alternate embodiment, the communication unit, while transmitting the message, might continue to monitor the downlink allocation indications to identify which uplink time slots have been allocated to it. When the communication unit completes its transmission, the logic flow ceases at the END block and the time slot allocator makes the previously allocated time slots available to fulfill other time slot allocation requests or to permit new time slot allocation requests.

Utilization of the N contiguously allocated uplink time slots results in improved channel throughput and less transmission time delay, especially under reduced channel loading conditions, compared to the known reservation ALOHA method (i.e., transmitting N uplink time slots in N time frames at a rate of one time slot per time frame). Idle uplink time slots residing between the allocated uplink time slots in the reservation ALOHA technique are used in the present invention to transmit information. Thus, the present invention reduces transmission time and provides more efficient channel bandwidth utilization by utilizing the idle uplink time slots.

When the N uplink time slots are not presently available (203), the time slot allocator queues (206) the time slot request in a priority queue. Generally, the time slot allocator allocates the requested number of uplink time slots to the highest priority time slot requests as the uplink time slots become available. Priority may be determined according to the type of packet, such as high priority given to protocol control packets, or via an explicit priority parameter contained in the time slot request. Upon servicing the high priority requests, the queuing of the remaining time slot requests may follow a predetermined queue discipline, such as a first-in, first-out (FIFO) procedure. While the communication unit's time slot request is in the priority queue, the time slot allocator continues to monitor (207) uplink time slot availability. When the N uplink time slots become available, the time slot allocator allocates (204) the N uplink time slots to the communication unit such that the N allocated uplink time slots are substantially contiguous in time.

Figure 3:
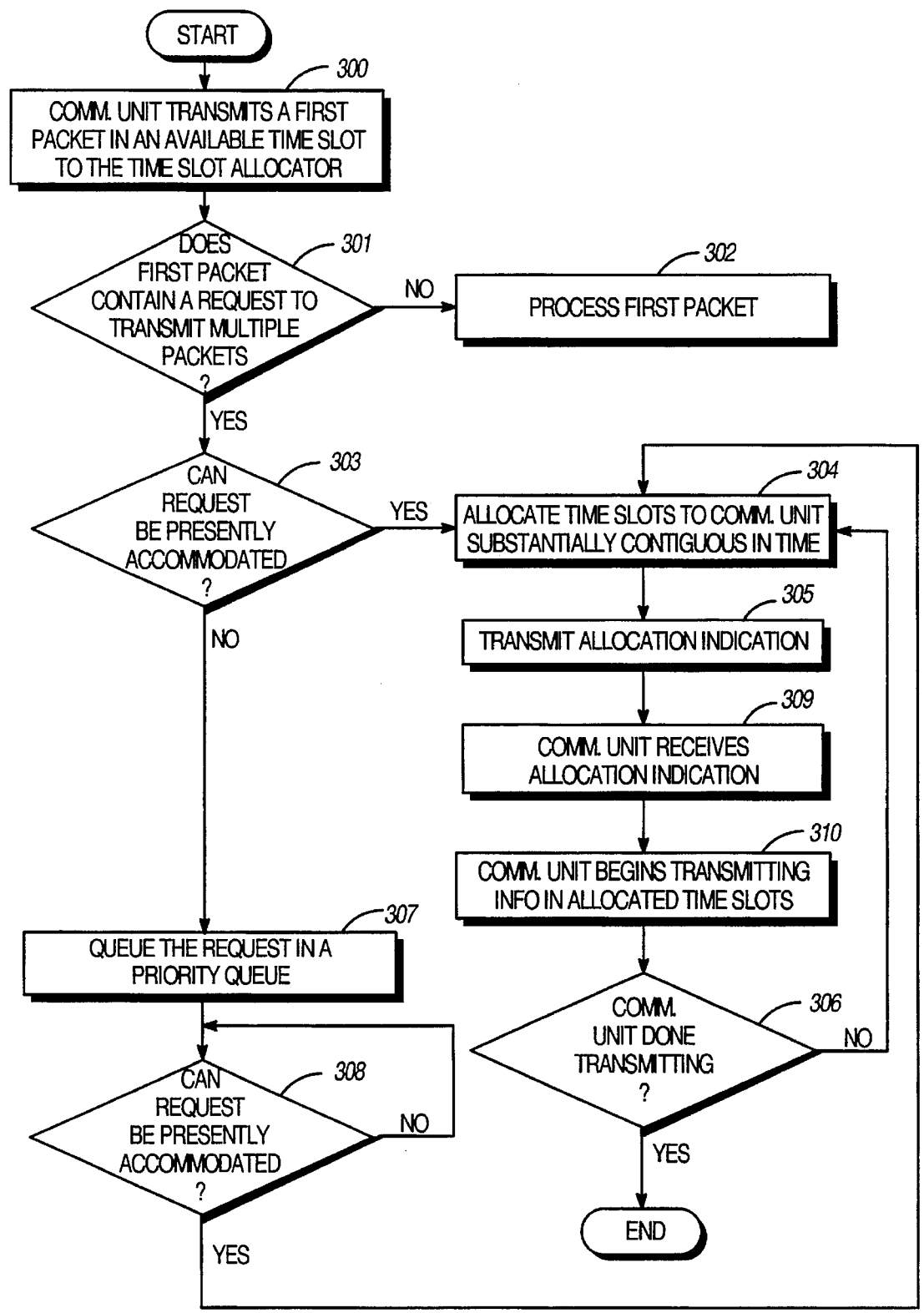
FIG. 3 illustrates an alternative logic flow diagram of steps executed by a time slot allocator and a communication unit in accordance with the present invention.

FIG. 3 illustrates an alternative logic flow diagram of steps executed to implement the present invention. Entering the flow diagram at the START block, the logic flow begins when a communication unit transmits (300) a first packet in an available uplink time slot to the time slot allocator. The first packet may contain a single data packet or a request to transmit multiple packets. As discussed above with reference to FIG. 2, when only a small quantity of data needs to be transmitted (i.e., an amount of data which fits entirely in the first uplink time slot), the first packet contains a single data packet. When the communication unit has a large amount of data to send (i.e., an amount of data that cannot entirely fit in the first uplink time slot), the first packet contains a request to transmit multiple packets. In contrast to the method of FIG. 2, this request is for allocation of an unknown number of available uplink time slots to the communication unit, with the allocation ending when the communication unit has completed its data transmission. For example, at the inception of a long data transfer, such as a facsimile transmission, the communication unit may not know the quantity of information (e.g., the number of facsimile pages) to be transmitted. Thus, the communication unit cannot accurately determine the number of uplink time slots required for transmission and, accordingly, sends a request to transmit multiple packets to the time slot allocator.

Similar to the request for N uplink time slots as described above with reference to FIG. 2, the multiple packet transmission request occupies a small amount of informational bandwidth, or time, and preferably includes an identification code of the requesting communication unit. Thus, due to the minimal amount of information in the multiple packet transmission request, the first packet may be transmitted in a portion of an uplink time slot. Therefore, by dividing each available uplink time slot into equal size portions, several communication units may transmit multiple packet transmission requests in a given available uplink time slot.

Upon receiving the first packet, the time slot allocator determines (301) whether the first packet contains a request to transmit multiple packets. When the first packet does not contain the request to transmit multiple packets, the time slot allocator processes (302) the first packet based on the predetermined processing procedure, as described above with regard to block 202 of FIG. 2. When the first packet contains the request to transmit multiple packets, the time slot allocator determines (303) whether the request can be presently accommodated. When the request can be presently accommodated, the time slot allocator allocates (304) uplink time slots to the communication unit such that the uplink time slots are substantially contiguous in time.

Upon allocation of the uplink time slots, the time slot allocator transmits (305) an allocation indication in each of the downlink time slots corresponding to the allocated uplink time slots. Similar to the allocation indication discussion provided above with regard to FIG. 2, each allocation indication includes a communication unit identification code that enables the requesting communication unit to verify that uplink time slots have been allocated to the communication unit. However, in contrast to the FIG. 2 discussion, the allocation indication does not provide a number of allocated time slots, but rather provides a code signifying an indeterminate number of allocated time slots. For example, the allocation indication might include a string of ones in a portion thereof (i.e., in the aforementioned slot descriptor block) to signify an indeterminate number of allocated time slots.

The communication unit receives (309) the allocation indication in at least one of the downlink time slots associated with the allocated uplink time slots and determines whether the time slot allocator has allocated the requested uplink time slots to the communication unit. Upon receiving an allocation indication that indicates time slot allocation to the communication unit, the communication unit begins transmitting (310) information in the allocated uplink time slots. The transmitted information generally comprises data communications and other necessary information, such as error coding or addressing. While the communication unit is transmitting its information, the time slot allocator monitors (306) the transmission to determine whether the communication unit has finished transmitting. While the communication unit is still transmitting, the time slot allocator continues to allocate (304) contiguous uplink time slots to the communication unit. When the communication unit has completed its transmission, the time slot allocator de-allocates any additional uplink time slots previously allocated to the communication unit and the logic flow ceases at the END block. To indicate the end of the multiple packet transmission, the communication unit preferably transmits a data word as part of the last uplink time slot's information to notify the time slot allocator of the transmission's conclusion.

When the request to transmit multiple packets cannot be presently accommodated (303) due to lack of available uplink time slots, the time slot allocator queues (307) the multiple packet transmission request in a priority queue. As previously discussed with reference to block 206 of FIG. 2, the time slot allocator allocates contiguous uplink time slots to the highest priority requests as the uplink time slots become available. Priority may be determined according to the type of packet, such as high priority given to protocol control packets, or via an explicit priority parameter contained in the multiple packet transmission request. Upon servicing the high priority requests, the queuing of the remaining time slot requests may follow a predetermined queue discipline, such as a first-in, first-out (FIFO) procedure. While the communication unit's multiple packet transmission request is in the priority queue, the time slot allocator continues to evaluate (308) whether the queued request can be accommodated. When the request to transmit multiple packets can be accommodated, the time slot allocator allocates (304) the contiguous uplink time slots to the communication unit.

Figure 4:
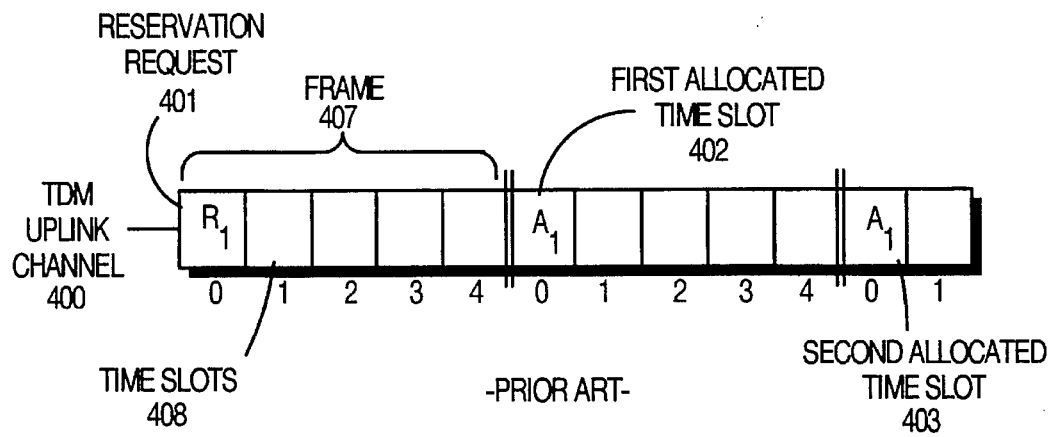
FIG. 4 illustrates a typical prior art time slot allocation.
Figure 5:
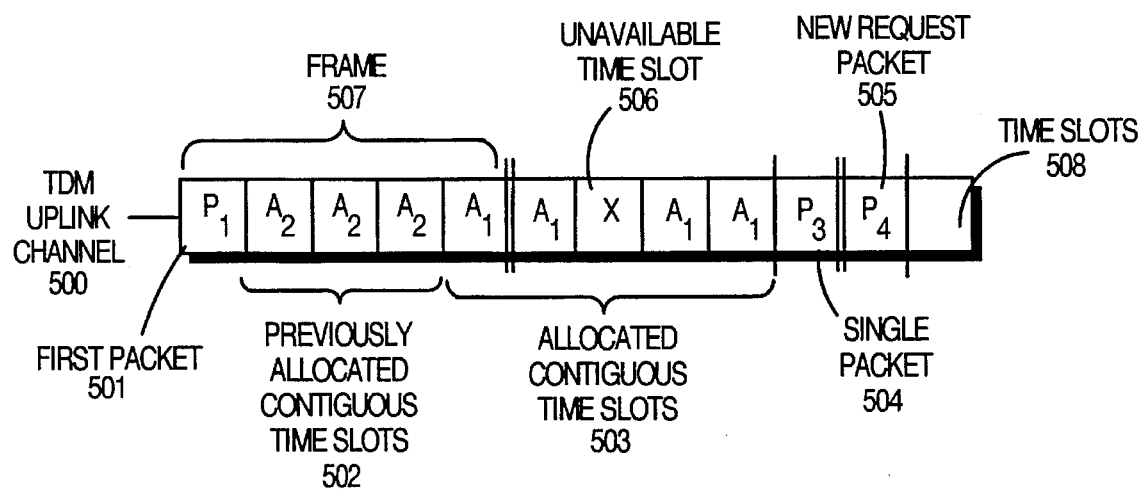
FIG. 5 illustrates time slot allocation in accordance with the present invention.

FIGS. 4 and 5 illustrate time slot allocation as implemented by a typical prior art methodology and the present invention, respectively. As previously mentioned with reference to FIG. 1, each TDM uplink channel 400, 500 is divided into a series of uplink time slots 408, 508. A predetermined number of the uplink time slots 408, 508 are grouped to form time frames 407, 507. In FIGS. 4 and 5, each time frame 407, 507 comprises five uplink time slots 408, 508.

In the known prior art methodology of reservation ALOHA, uplink time slots 408 are allocated on the TDM channel 400 by the time slot allocator. When an uplink time slot 408 is available, a communication unit transmits a data packet containing a reservation request ($R_1$) 401 to the time slot allocator in the available uplink time slot 408. The reservation request 401 includes the number of uplink time slots 408 needed by the communication unit. Assume for purposes of this discussion that the reservation request 401 is transmitted in the first uplink time slot 408 of the first time frame 407. Upon reception and subsequent processing of the reservation request 401 by the time slot allocator, the time slot allocator allocates the first uplink time slot 408 of each subsequent time frame 407 to the communication unit for the equivalent number of time frames 407 corresponding to the desired number of uplink time slots 408. Thus, the first allocated uplink time slot ($A_1$) 402 is the first uplink time slot 408 of the second time frame 407, the second allocated uplink time slot ($A_1$) 403 is the first uplink time slot 408 of the third time frame 407, and so on. Therefore, the reservation ALOHA method allocates one uplink time slot 408 per time frame 407 to the requesting communication unit. As clearly evident with this procedure, most of the other uplink time slots 408 on the TDM channel 400 remain unused during periods of few reservation requests 401, while the requesting communication unit incurs substantial transmission delay due to being allocated only a single uplink time slot 408 in each time frame 407.

Similar to reservation ALOHA, the present invention utilizes a time slot allocator to allocate uplink time slots 508 on the TDM channel 500. However, in contrast to the prior art, the present invention utilizes a more efficient allocation procedure. When an uplink time slot 508 is available, as indicated by the slot descriptor block of a corresponding downlink time slot (not shown), a communication unit transmits a first packet ($P_1$) 501 containing a request for allocation of N uplink time slots to the time slot allocator in the available uplink time slot 508. The time slot request includes the number of uplink time slots (N) required by the communication unit. Assume for purposes of this discussion that the first packet 501 is transmitted in the first uplink time slot 508 of the first time frame 507 and contains a request for four uplink time slots 508. Upon reception and subsequent processing of the first packet 501 by the time slot allocator, the time slot allocator determines whether four substantially contiguous uplink time slots 508 are available. As depicted in FIG. 5, the three contiguous uplink time slots ($A_2$) 502 immediately following the first packet 501 have been previously allocated to another communication unit due to an earlier time slot request. Thus, these previously allocated contiguous time slots 502 are presently unavailable for allocation to the communication unit. Therefore, since the desired number of contiguous uplink time slots 508 are presently unavailable, the time slot allocator queues the time slot request in a priority queue.

When the previously allocated contiguous uplink time slots 502 have expired, the time slot allocator may allocate the N uplink time slots 508 requested by the communication unit. As detailed above, the uplink time slots 508 are allocated such that the resulting allocated time slots ($A_1$) 503 are substantially contiguous in time. The time slot allocator informs the communication unit of the time slot allocation by including an allocation indication in a portion (i.e., slot descriptor block) of each of the downlink time slots (not shown) associated with the allocated uplink time slots ($A_1$) 503 as described above with regard to FIGS. 1 and 2. As shown in FIG. 5, the allocated contiguous uplink time slots 503 reside in two consecutive time frames 507 and occupy the last uplink time slot 508 in the first time frame 507 and the first, third, and fourth uplink time slots 508 in the second time frame 507. Thus, due to the substantially contiguous nature of the time slot allocation provided by the present invention, a transmission requiring four time frame intervals in the prior art requires a transmission time of only five time slots (i.e., only a single frame time) to complete. Therefore, the TDM channel 500, as allocated via the present invention, is more efficiently used and the requesting communication unit experiences less transmission delay than with the prior art technique. It should be noted that the allocated contiguous uplink time slots 503 are substantially contiguous, as opposed to definitively contiguous, since an unavailable uplink time slot 506 prevents the time slot allocator from allocating four serially adjacent uplink time slots 508 to the communication unit.

As also shown in FIG. 5, the present invention permits time slot allocation across frame boundaries. Therefore, the present invention can accommodate requests for time slots 508 that exceed the number of time slots 508 in a time frame 507 by allocating time slots 508 in consecutive time frames 507.

After the communication unit has utilized the allocated contiguous uplink time slots 503, the uplink time slots 508 are returned to the available state. The state, or status, of each uplink time slot 508 is indicated in the slot descriptor block of a corresponding downlink time slot, as described above. Thus, another communication unit may use an available uplink time slot 508 to transmit a single data packet ($P_3$) 504 or a new request packet ($P_4$) 505 to the time slot allocator. The single data packet 504 is immediately processed by the time slot allocator via the previously described predetermined processing procedure, while the new packet request 505 is either queued or serviced depending on uplink time slot availability.

The present invention provides a method for allocating uplink time slots to communication units in a communication system. With this invention, uplink time slots are allocated to communication units in a substantially contiguous manner. Thus, the transmission time delay associated with prior art allocation techniques is substantially reduced. For example, with a time frame period of seventy-five milliseconds (5 time slots per frame, fifteen milliseconds per time slot) and a data packet length of four uplink time slots, a minimum transmission time of only sixty milliseconds is required as compared to a three hundred millisecond transmission time using reservation ALOHA. Further, this reduction in transmission time delay inherently provides more efficient use of the TDM data channel over a wide range of channel loading conditions.

What we claim is:

1. In a communication system that includes a communication unit, an uplink communication channel, a downlink communication channel, and a time slot allocator, the uplink communication channel being divided into a plurality of uplink time slots, the downlink communication channel being divided into a plurality of downlink time slots having a one-to-one correspondence with the plurality of uplink time slots, a method for allocating the plurality of uplink time slots to the communication unit, the method comprising the steps of:

a) transmitting, by the communication unit, a first packet in an available uplink time slot of the plurality of uplink time slots;

b) upon receiving the first packet, determining, by the time slot allocator, whether the first packet contains a request for allocation of N uplink time slots, wherein N is an integer greater than one;

c) when the first packet contains the request for allocation of N uplink time slots, determining, by the time slot allocator, whether N uplink time slots are available;

d) when the N uplink time slots are available, allocating, by the time slot allocator, the N uplink time slots to the communication unit to produce N allocated uplink time slots, wherein the N allocated uplink time slots are substantially contiguous in time; and e) transmitting, by the time slot allocator, an allocation indication to the communication unit in each of N downlink time slots, wherein the N downlink time slots correspond to the N allocated uplink time slots and wherein the allocation indication indicates a number of the N allocated uplink time slots remaining in said allocation.

2. The method of claim 1 further comprising the step of:
   f) when the first packet does not contain the request for allocation of the N uplink time slots, processing, by the time slot allocator, the first packet based on a predetermined processing procedure.

3. The method of claim 1, wherein step (a) further comprises the step of transmitting the first packet in the available uplink time slot based on a slotted ALOHA protocol.

4. The method of claim 1, wherein step (a) further comprises the step of transmitting the first packet in a portion of the available uplink time slot.

5. The method of claim 1, wherein the plurality of uplink time slots are grouped into a plurality of uplink time frames, wherein each uplink time frame of the plurality of uplink time frames includes a predetermined number of uplink time slots, and wherein the allocation of step (d) further comprises allocating the N uplink time slots to the communication unit, wherein the N allocated uplink time slots are substantially contiguous in time and reside in at least two consecutive uplink time frames of the plurality of uplink time frames.

6. The method of claim 5, wherein the N allocated uplink time slots exceeds the predetermined number of uplink time slots in each uplink time frame of the plurality of uplink time frames.

7. The method of claim 1, further comprising the step of:
   f) when the N uplink time slots are not available, queuing the request for allocation of the N uplink time slots until the N uplink time slots become available.

8. The method of claim 7, wherein step (f) further comprises the step of prioritizing the queuing of the request for allocation of the N uplink time slots.

9. In a communication system that includes a communication unit, an uplink communication channel, a downlink communication channel, and a time slot allocator, the uplink communication channel being divided into a plurality of uplink time slots, the downlink communication channel being divided into a plurality of downlink time slots having a one-to-one correspondence with the plurality of uplink time slots, a method for the time slot allocator to allocate the plurality of uplink time slots to the communication unit, the method comprising the steps of:
   a) receiving a first packet from the communication unit in an available uplink time slot of the plurality of uplink time slots;
   b) determining whether the first packet contains a request for allocation of N uplink time slots, wherein N is an integer greater than one;
   c) when the first packet contains the request for allocation of the N uplink time slots, determining whether the N uplink time slots are available;
   d) when the N uplink time slots are available, allocating the N uplink time slots to the communication unit to produce N allocated uplink time slots, wherein the N allocated uplink time slots are substantially contiguous in time; and
   e) transmitting an allocation indication to the communication unit in each of N downlink time slots, wherein the N downlink time slots correspond to the N allocated uplink time slots and wherein the allocation indication indicates a number of the N allocated uplink time slots remaining in said allocation.

10. The method of claim 9 further comprising the step of:
    f) when the first packet does not contain the request for allocation of the N uplink time slots, processing the first packet based on a predetermined processing procedure.

11. The method of claim 9, wherein the plurality of uplink time slots are grouped into a plurality of uplink time frames, wherein each uplink time frame of the plurality of uplink time frames includes a predetermined number of uplink time slots, and wherein the allocation of step (d) further comprises allocating the N uplink time slots to the communication unit, wherein the N allocated uplink time slots are substantially contiguous in time and reside in at least two consecutive uplink time frames of the plurality of uplink time frames.

12. The method of claim 11, wherein the N allocated uplink time slots exceeds the predetermined number of uplink time slots in each uplink time frame of the plurality of uplink time frames.

13. In a communication system that includes a communication unit, an uplink communication channel, a downlink communication channel, and a time slot allocator, the uplink communication channel being divided into a plurality of uplink time slots, the downlink communication channel being divided into a plurality of downlink time slots having a one-to-one correspondence with the plurality of uplink time slots, a method for the communication unit to utilize N uplink time slots of the plurality of uplink time slots, the method comprising the steps of:
    a) transmitting a first packet to the time slot allocator in an available uplink time slot of the plurality of uplink time slots, the first packet containing a request for allocation of N uplink time slots, wherein N is an integer greater than one;
    b) upon allocation of the N uplink time slots from the time slot allocator to produce N allocated uplink time slots, receiving, from the time slot allocator, an allocation indication in each downlink time slot of N downlink time slots, wherein the N downlink time slots correspond to the N allocated uplink time slots and wherein the allocation indication indicates a remaining number of the N allocated uplink time slots to be used by the communication unit; and
    c) upon receiving the allocation indication, utilizing the N allocated uplink time slots for transmitting information, wherein the N allocated uplink time slots are substantially contiguous in time.

* * * * *